No. 672,718. Patented Apr. 23, 1901.
P. STEINHAUER.
AUTOMOBILE DRIVING GEAR.
(Application filed Feb. 11, 1901.)
(No Model.) 3 Sheets—Sheet 1.
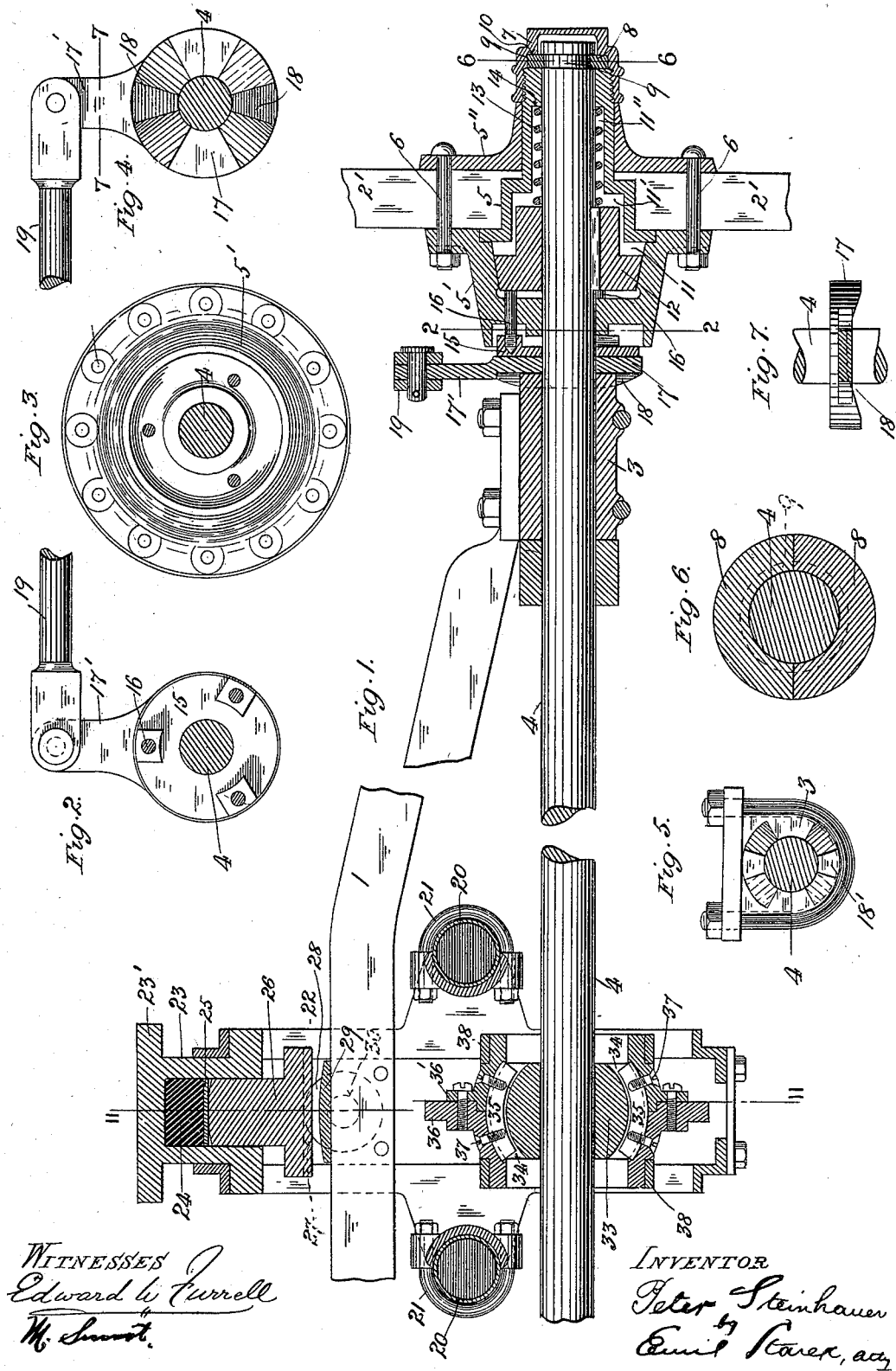

No. 672,718. Patented Apr. 23, 1901.
P. STEINHAUER.
AUTOMOBILE DRIVING GEAR.
(Application filed Feb. 11, 1901.)

(No Model.) 3 Sheets—Sheet 2.

WITNESSES
Edward L. Furrell
M. Smoot.

INVENTOR
Peter Steinhauer
by
Emil Starek, atty

No. 672,718. Patented Apr. 23, 1901.
P. STEINHAUER.
AUTOMOBILE DRIVING GEAR.
(Application filed Feb. 11, 1901.)
(No Model.) 3 Sheets—Sheet 3.
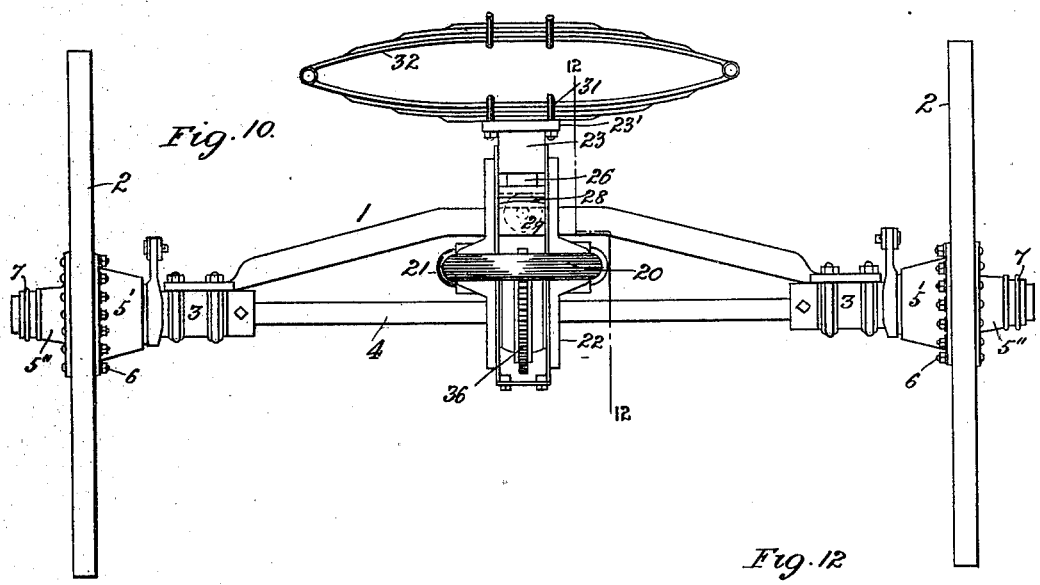
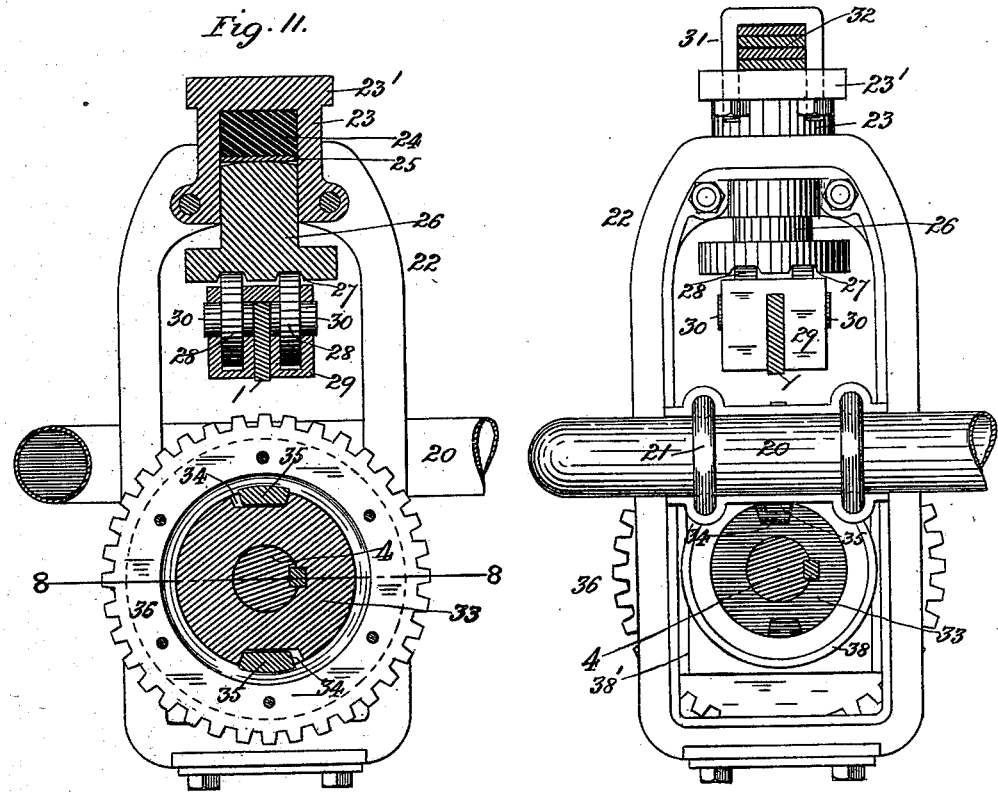
WITNESSES
Edward W. Furrell
M. Smoot
INVENTOR
Peter Steinhauer
by
Emil Starek, atty

UNITED STATES PATENT OFFICE.

PETER STEINHAUER, OF ST. LOUIS, MISSOURI.

AUTOMOBILE DRIVING-GEAR.

SPECIFICATION forming part of Letters Patent No. 672,718, dated April 23, 1901.

Application filed February 11, 1901. Serial No. 46,902. (No model.)

*To all whom it may concern:*

Be it known that I, PETER STEINHAUER, a citizen of the United States, residing at St. Louis, State of Missouri, have invented certain new and useful Improvements in Automobile Driving-Gear, of which the following is a full, clear, and exact description, reference being had to the accompanying drawings, forming a part hereof.

My invention has relation to improvements in automobile driving-gear; and it consists in the novel construction and arrangement of parts more fully set forth in the specification and pointed out in the claims.

Figure 8:
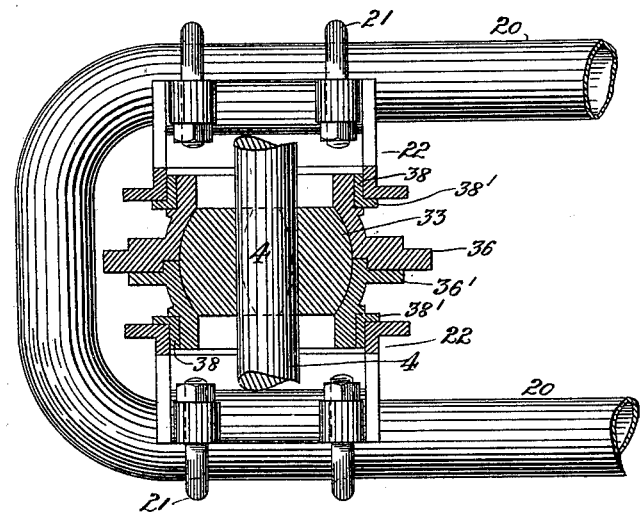
Figure 9:
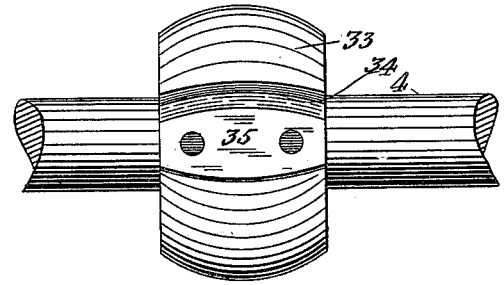

In the drawings, Figure 1 is a middle vertical longitudinal section taken through the hub and driving mechanism of the rear truck, the axle being shown in elevation. Fig. 2 is a transverse section on line 2 2 of Fig. 1 looking to the left. Fig. 3 is an end view of the conical section of the hub. Fig. 4 is a face view of the rotatable clutch-disengaging disk inserted between the axle-bearing and wheel. Fig. 5 is an end view of the axle-bearing, showing the face coöperating with the disk shown in Fig. 4. Fig. 6 is a transverse section of the axle and abutment carried thereby, taken on line 6 6 of Fig. 1. Fig. 7 is a section on line 7 7 of Fig. 4, showing edge view of the rotatable disk. Fig. 8 is a horizontal section on line 8 8 of Fig. 11, showing also plan of coupling-pole. Fig. 9 is a face view of the coupling-block carried by the spherical segment secured to the axle and an elevation of said segment. Fig. 10 is an elevation of the rear truck complete. Fig. 11 is a vertical transverse section on line 11 11 of Fig. 1, and Fig. 12 is a transverse vertical section on line 12 12 of Fig. 10.

The object of my invention is to construct a driving mechanism for horseless carriages which can be readily brought into engagement with or disengaged from the axle of the driven truck of the carriage, one which will be positive in its action and reliable, one which will be simple in its construction and readily manipulated by the operator, one in which perfect horizontality shall always be maintained by the carriage-body irrespective of the unevenness of the ground traversed by the truck-wheels, and one possessing further and other advantages better apparent from a detailed description of the invention, which is as follows:

Referring to the drawings, 1 represents the truck, to which the road-wheels 2 2 are attached, and 3 the bearings for the rotatable axle 4 of said wheels. The hub of the wheel 2 is made of a series of sections 5 5' 5'', the inner section 5 serving as a support for the spokes 2', between the bases of which pass the bolts 6, by which the sections 5' and 5'' are coupled together. The section 5 is peripherally screw-threaded adjacent to its outer end, said screw-threaded portion having passed thereover the terminal cap or cover 7, by which the end of the axle is protected. The outer end of the section 5 bears against a disk or abutment 8, made of two sections, which are let into the annular peripheral groove 9, formed adjacent to the end of the axle, the disk 8 being held between the screw-threaded end of the said section 5 and the annular shoulder 10, formed in the cap 7, it being understood that the wheel 2 and the several sections of the hub, cup 7, and disk 8 are free to loosely turn as a unit about the axle 4 or vice versa, the latter being freely rotatable within the hub. Between the sections 5 5' is formed a substantially conical chamber 11, having the reduced cylindrical extensions 11' 11'', the chamber 11 11' confining a clutch 12, having a conical head whose surface is adapted to frictionally engage the correspondingly-included interior walls of the section 5' of the hub, the engagement being effected by a coiled spring 13, surrounding the axle, one end bearing against the shoulder 14 of the outer end of section 5 and the opposite end bearing against the base of the clutch 12. When the clutch 12 and hub-section 5' are in engagement, the wheel as a whole will turn with the axle; but the moment the clutch is disengaged the wheel will remain stationary. The clutch is feathered to the axle to move longitudinally along the same by any form of feather, as shown in Fig. 1. The disengagement of the clutch from the hub of the wheel is effected as follows: Loosely passed over the axle between the hub and axle-bearing is a plate 15, from one face of which project a series of pins 16, passing loosely through the adjacent face of the section 5', with which it rotates about the axle 4, the inner end of the pins being normally in engagement with the adjacent end of the clutch. Between the plate 15 and the axle-bearing 3 and rotatable freely about the axle is a disk 17, provided on the face which is adjacent the bearing with a series of depressions or pockets 18, whose walls have a plane center with inclined sides, (see Fig. 7,) said walls nesting with a corresponding series of ridges or wedge-shaped projections 18', formed on the adjacent faces of the bearings 3. (See Fig. 5.) Upon rotating the disk 17 in either direction, so as to cause the inclined surfaces of the disk to ride over the inclined walls or faces of the bearing 3, the plate 15 will be forced inwardly or toward the wheel against the resilience of the spring 13, thus disengaging the clutch from the hub and permitting the axle to rotate independent thereof. To rotate the disk 17, the latter is provided with an arm 17', coupled pivotally to a rod 19, leading to within easy reach of the operator seated in the carriage.

Only one truck (the rear or drawn one) is illustrated in the present drawings, 20 representing the pipe coupling-bar by which the rear and front trucks (not shown) are connected. The pipes 20 are secured by means of straps 21 to the sides of a yoke or frame 22, depending from the truck-bar 1, being disposed below the latter, the ends of the pipes being closed and encircling the said yoke 22. The latter is connected to the truck by the following intermediate connections: The upper end of the yoke has bolted thereto a cylinder 23, having an upper flange 23'. Within the cylinder is confined a rubber cushion 24, a plate 25 being interposed between it and a plunger 26, the latter having an expanded base provided with two parallel grooves or ways 27 27 for the reception of the rollers 28 28, mounted in a saddle or casing 29, resting directly upon and spanning the truck-bar 1, each roller having an independent spindle or shaft 30. Secured by suitable straps 31 to the flange 23' are the wagon-body springs 32. From the arrangement of the connections as described it is apparent that should the wheels 2 2 pass over a surface not truly horizontal or over a surface more or less rough the plunger 26 and yoke 22, carried thereby, will as a unit rock or oscillate about the rollers 28 as a pivot, thus insuring a vertical suspension of the yoke and a consequent perfect horizontality for the wagon-body resting on the springs 32.

The connection between the driving sprocket-wheel and the axle of the truck 1 allows for the free oscillation of the yoke about the rollers 28 under the circumstances just referred to. Keyed to the axle 4, within the yoke 22, is a spherical segment 33, provided with diametrically opposite pockets 34, whose bases follow the general curvature of the surface of the sphere and which, moreover, are disposed parallel to the axis of rotation of the axle. Each pocket 34 receives a coupling-block 35, which couples the said segment 33 to the driving sprocket-wheel of the carriage. The driving-sprocket is made of two sections 36 36', bolted together, each section serving to partially support the block 35 by means of countersunk screws 37, as shown in Fig. 1. The block 35 does not quite fill the pocket, being movable therein both in a plane parallel with the axle and at right angles thereto. Should the axle tilt from a horizontal in passing over an uneven surface, as heretofore referred to, the segment 33 is free to rock between the blocks 35 35 by reason of the freedom of the latter to ride over the bases of the pockets in a plane parallel to the axle. In imparting rotation to the axle the blocks simultaneously engage the diagonally opposite side walls of the pockets, the particular walls engaged depending on the direction of rotation which is imparted to the shaft. (See Figs. 11 and 12.) The sprocket-chain passing over the sprocket-wheel 36 36' is not shown, nor the motor by which the chain is driven, as these form no part of the present invention. To insure against any deviation from the vertical plane of rotation of the driving sprocket-wheel, the bosses of the latter rotate within suitable brass rings or bearings 38, held in place between the inner side walls of the yoke by the flanges 38', cast integral with the rings and bearing frictionally against such sides.

From the foregoing it is apparent that the several advantages above enumerated are inherent in the present construction; but it must be understood that I do not limit myself to the exact details herein set forth, as these may be departed from in a measure without affecting the spirit of my invention.

Having described my invention, what I claim is—

1. In an automobile driving mechanism, a truck, an axle carried by the same, wheels loosely mounted on the axle, a yoke or frame pivotally suspended from the truck, a sprocket-wheel carried by the yoke and adapted to engage the axle and impart rotation thereto, and devices under the control of the operator for clamping the wheels firmly to the axle to cause the same to rotate therewith, substantially as set forth.

2. In an automobile driving mechanism, a truck, an axle carried by the same, wheels loosely mounted on the axle, a yoke pivotally suspended from the truck and passing around the axle, a spherical segment carried by the axle within the yoke, a sectional sprocket-wheel embracing the segment, means for coupling the latter to the sprocket-wheel, and means under the control of the operator for clamping the wheels firmly to the axle, substantially as set forth.

3. In an automobile driving mechanism a truck, an axle carried by the same, wheels mounted on the axle and rotating therewith during the running of the carriage, a yoke, pivotally suspended from the truck, a sectional sprocket-wheel carried by and rotating in the yoke, a spherical segment carried by the axle and confined within the sections of the sprocket-wheel, peripheral pockets formed in the spherical segment the bottom of the same following the general curvature of the sphere defining the segment, and coupling-blocks secured to the sprocket-wheel and operating in said pockets, the parts operating substantially as and for the purpose set forth.

4. In an automobile driving mechanism, a truck, wheels carried by the same, an axle for said wheels, a yoke pivotally suspended from the truck, a cylinder secured to the upper portion of the yoke, a cushion in said cylinder, a plunger operating in said cylinder below the cushion, a saddle mounted on the truck-bar, rollers mounted in said saddle, parallel ways or grooves formed in the bottom of the plunger for the reception of the rollers, and suitable driving mechanism carried by the yoke for imparting rotation to the axle, substantially as set forth.

5. In an automobile driving mechanism, a truck, an axle for the same, wheels loosely rotatable about the axle, a spring-controlled clutch confined within the hub of either wheel and feathered to the axle and adapted to frictionally engage the inner surface of the hub, and devices under the control of the operator for disengaging the clutch from the hub, substantially as set forth.

6. In an automobile driving mechanism, a truck, an axle for the same, wheels loosely rotatable about the axle, a spring-controlled clutch feathered to the axle within the hub of each wheel and normally in engagement with the hub, a plate passed over the axle and having pins loosely projecting through the adjacent wall of the hub and bearing against the clutch, and means interposed between the axle-bearing and the said plate, under the control of the operator for forcing the plate and pins carried thereby against the clutch and disengaging the same from the hub of the wheel, substantially as set forth.

7. In an automobile driving mechanism, a truck, an axle for the same, a wheel having a hub freely rotatable about the axle, a spring-controlled clutch within the hub, a plate passed over the axle and having pins passed through the adjacent wall of the hub and bearing against the clutch, a disk loosely rotatable about the axle and interposed between the axle-bearing and the aforesaid plate, the adjacent faces of the disk and axle-bearing having engaging inclined or wedge surfaces and depressions whereby upon rotation of the disk in either direction the latter will be forced against the plate and cause the disengagement of the clutch from the hub, substantially as set forth.

8. In an automobile, a wheel having a sectional hub comprising an interior section for the support of the spokes, outer sections bolted to one another the bolts passing between the bases of the spokes, a cap passed over the outer end of the inner section, a sectional disk surrounding the axle of the vehicle and confined securely between the end of the inner section of the hub and the cap, a spring-controlled clutch confined within the hub, and means under the control of the operator for disengaging the clutch from the hub, substantially as set forth.

9. In an automobile, a rear truck, a yoke suspended pivotally therefrom, and a coupling-pole secured to said yoke and extending forward therefrom, substantially as set forth.

10. In an automobile a truck, a yoke suspended pivotally therefrom, an axle passing through the yoke, driving mechanism for the axle carried by the yoke, the axle being free to tilt when the wheels thereof pass over uneven surfaces without disturbing the vertical position of the yoke or the horizontality of the carriage-body supported thereby, substantially as set forth.

In testimony whereof I affix my signature in presence of two witnesses.

PETER STEINHAUER.

Witnesses:
 EMIL STAREK,
 MARGUERITE SMOOT.